(12) United States Patent
Traversat et al.

(10) Patent No.: US 6,959,331 B1
(45) Date of Patent: Oct. 25, 2005

(54) SYSTEM AND METHOD FOR OPERATING A CLIENT NETWORK COMPUTER IN A DISCONNECTED MODE BY ESTABLISHING A CONNECTION TO A FALLOVER SERVER IMPLEMENTED ON THE CLIENT NETWORK COMPUTER

(75) Inventors: Bernard A. Traversat, San Francisco, CA (US); Laurent Demailly, Mountain View, CA (US); Michael Duigou, Fremont, CA (US); Hsiao-Keng Chu, Palo Alto, CA (US); Gregory L. Slaughter, Palo Alto, CA (US); Thomas E. Saulpaugh, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 694 days.

(21) Appl. No.: 09/638,285

(22) Filed: Aug. 14, 2000

(51) Int. Cl.[7] ............................................. G06F 15/177
(52) U.S. Cl. ..................................... 709/222; 713/1.2
(58) Field of Search ................................ 709/220–222; 713/1, 2; 717/168

(56) References Cited

U.S. PATENT DOCUMENTS

| | | | |
|---|---|---|---|
| 5,452,454 A * | 9/1995 | Basu .............................. | 713/2 |
| 5,842,011 A * | 11/1998 | Basu .............................. | 713/2 |
| 5,978,912 A * | 11/1999 | Rakavy et al. ................. | 713/2 |
| 6,167,567 A * | 12/2000 | Chiles et al. ............... | 717/173 |
| 6,175,918 B1 * | 1/2001 | Shimizu ........................ | 713/1 |
| 6,301,710 B1 * | 10/2001 | Fujiwara ...................... | 717/175 |
| 6,345,308 B1 | 2/2002 | Abe | |
| 6,553,037 B1 | 4/2003 | Pivowar et al. | |
| 6,578,054 B1 | 6/2003 | Hopmann et al. | |
| 2003/0037020 A1 * | 2/2003 | Novak et al. .................. | 707/1 |
| 2003/0140220 A1 * | 7/2003 | Lawrance et al. ............. | 713/1 |

* cited by examiner

*Primary Examiner*—Ario Etienne
*Assistant Examiner*—Oanh Duong
(74) *Attorney, Agent, or Firm*—Robert C Kowert; Meyertons, Hood, Kivlin, Kowert & Goetzel, P.C.

(57) ABSTRACT

A system and method of operating a client network computer in a disconnected mode. A client computer system includes a client storage device, a processor, a network interface, a failover server and a software manager. The processor is configured to execute software instructions stored in the client storage device. The network interface is configured to connect the client computer system to a remote network server unit. A failover server implemented on the client computer system is configured to provide functionality similar to the remote network server unit by accessing a copy of a network database file stored on the client storage device. A software manager stored in the client storage device is configured to cause the client computer system to connect to the remote network server unit if the remote network server unit is available or to cause the client computer system to connect to the failover server if the remote network server unit is not available. The remote network server unit is configured to provide a client cache image file to the client computer system. The client cache image file contains information, such as a copy of the operating system, a copy of client boot configuration files and a copy of the network database file, which causes the client computer system environment to appear to a user as though the client computer system is connected to the remote network server unit when the client computer system is actually connected to the failover server.

26 Claims, 7 Drawing Sheets

SYSTEM AND METHOD FOR OPERATING A CLIENT NETWORK COMPUTER IN A DISCONNECTED MODE BY ESTABLISHING A CONNECTION TO A FALLOVER SERVER IMPLEMENTED ON THE CLIENT NETWORK COMPUTER

BACKGROUND OF THE INVENTION

1. Field of the Invention

This invention relates to network computer systems and, more particularly, to the operation of a client computer system disconnected from the network.

2. Description of the Related Art

The need for information to be available to multiple users on a computer system created a need for computer networks. Computer networks are configured in many different ways across many different platforms. However, the demand for fast network connections and high reliability has placed increasing demands on computer networks.

Many computer networks are configured such that a remote server is connected to multiple client computers, such as the computer network illustrated in FIG. 1. In one configuration, a client computer must have access to the remote network server during the boot up process in order to be able to boot up. The remote network servers typically contain operating system and configuration files that the client needs in order to boot. The operating system and configuration files are downloaded to or accessed by the client during boot up.

If the network server goes down while client computers are connected and running, the client computers may be disabled. While the network server is down, client computers may not be able to be rebooted or operate on any applications or files that were located on the network server. This scenario can reduce workplace productivity significantly. Therefore, it is desirable for client computers to be usable during a remote server failure or network link failure.

Other networks are configured such that a remote network server must be accessible by the client during the login process in order for the client to have access to network resources. If the remote network server is unavailable, the client must manually login to a local domain to run offline or disconnected from the server. During this time, none of the network resources are available to the client. When the network connection to the remote network server is reestablished, a human operator must resynchronize files that were modified on the client computer and reside on the remote network server to the remote network server. Additionally, files such as applications software that were upgraded on the remote server must be manually transferred to the client computer. Therefore, it is desirable for a human operator not to have to copy modified files to or from the remote network server.

SUMMARY

The problems outlined above may in large part be solved by a system and method of operating a client network computer in a disconnected mode.

In one embodiment, a client computer system includes a client storage device, a processor coupled to the client storage device, a network interface, a failover server and a software manager. The processor is configured to execute software instructions stored in the client storage device. The network interface is configured to connect the client computer system to a remote network server unit. A failover server implemented on the client computer system is configured to provide functionality similar to the remote network server unit by accessing a copy of a network database file stored on the client storage device. A software manager stored in the client storage device is configured to cause the client computer system to connect to the remote network server unit if the remote network server unit is available or to cause the client computer system to connect to the failover server if the remote network server unit is not available. The remote network server unit is configured to provide a client cache image file to the client computer system. The client cache image file contains information, such as a copy of the operating system, a copy of client boot configuration files and a copy of the network database file, which causes the client computer system environment to appear to a user as though the client computer system is connected to the remote network server unit when the client computer system is actually connected to the failover server. An export tool uses a cache manifest file to generate the client cache image file. The cache manifest file may contain a list of the files and their locations and versions that make up the cache image file.

In additional embodiments, the client computer system may include an update software routine, which is configured to perform an update sequence by comparing a version number associated with the client cache image file stored on the client computer system with a second version number of a second client cache image file stored on the network update server. The update software routine notifies the network update server when the two version numbers are not the same. Upon receiving the notification, the network update server sends an updated copy of the client cache image file to the client computer system. Additionally, the client computer system may include a heartbeat software routine, which monitors a connection to the remote database server and a connection to the network update server. The heartbeat software routine is configured to periodically notify the update software routine when the network update server is available and an update sequence is necessary.

The disconnected mode of operation and the update sequence may advantageously improve client network computer operations by allowing users to run in a disconnected mode while the network server is unavailable and by providing an automated update service to update files between a client computer system and a remote server unit once the server is available.

BRIEF DESCRIPTION OF THE DRAWINGS

Other objects and advantages of the invention will become apparent upon reading the following detailed description and upon reference to the accompanying drawings in which.

Figure 1:
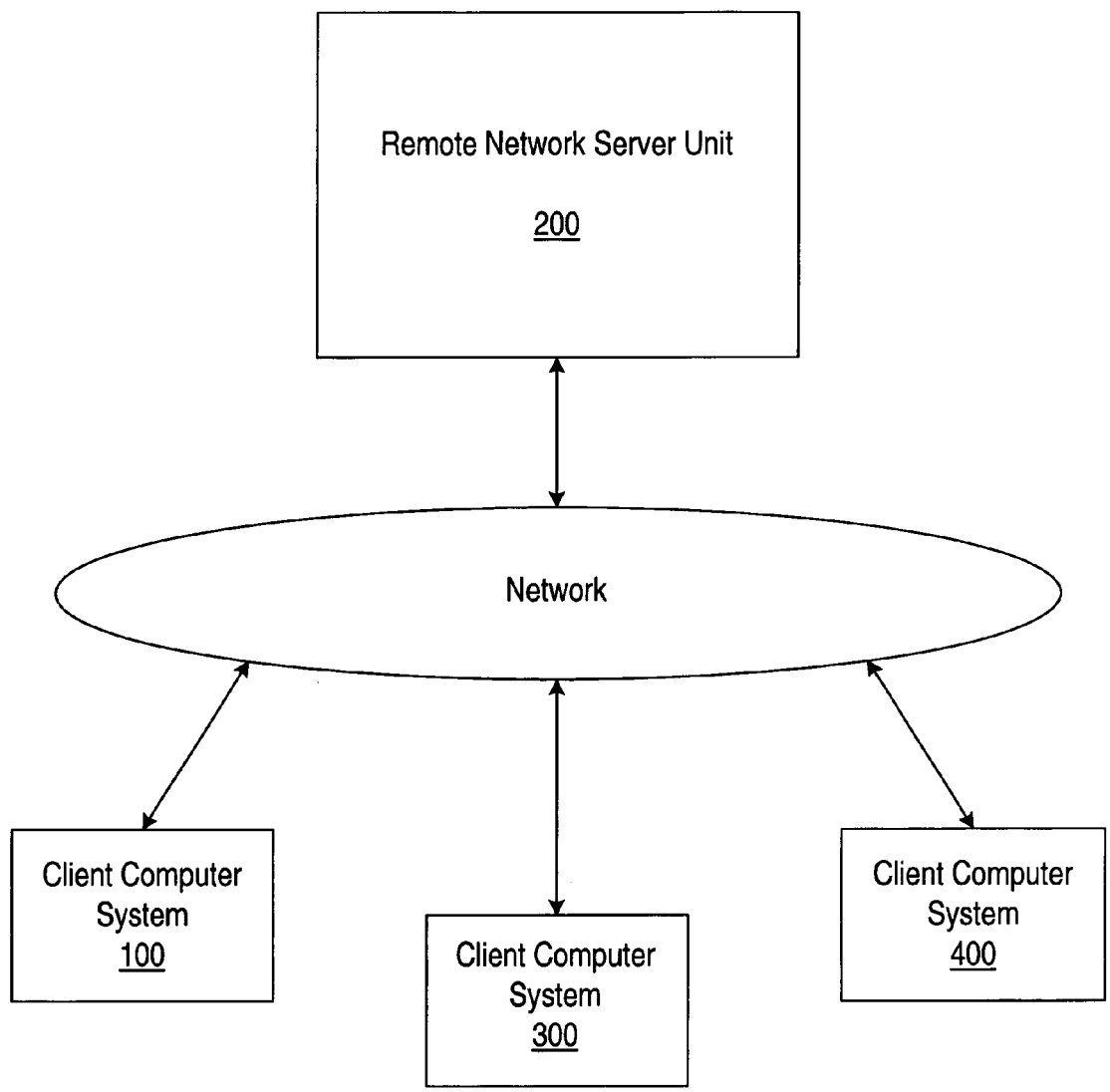
FIG. 1 is an embodiment of a network computer system which is well known in the industry and is considered prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 2:
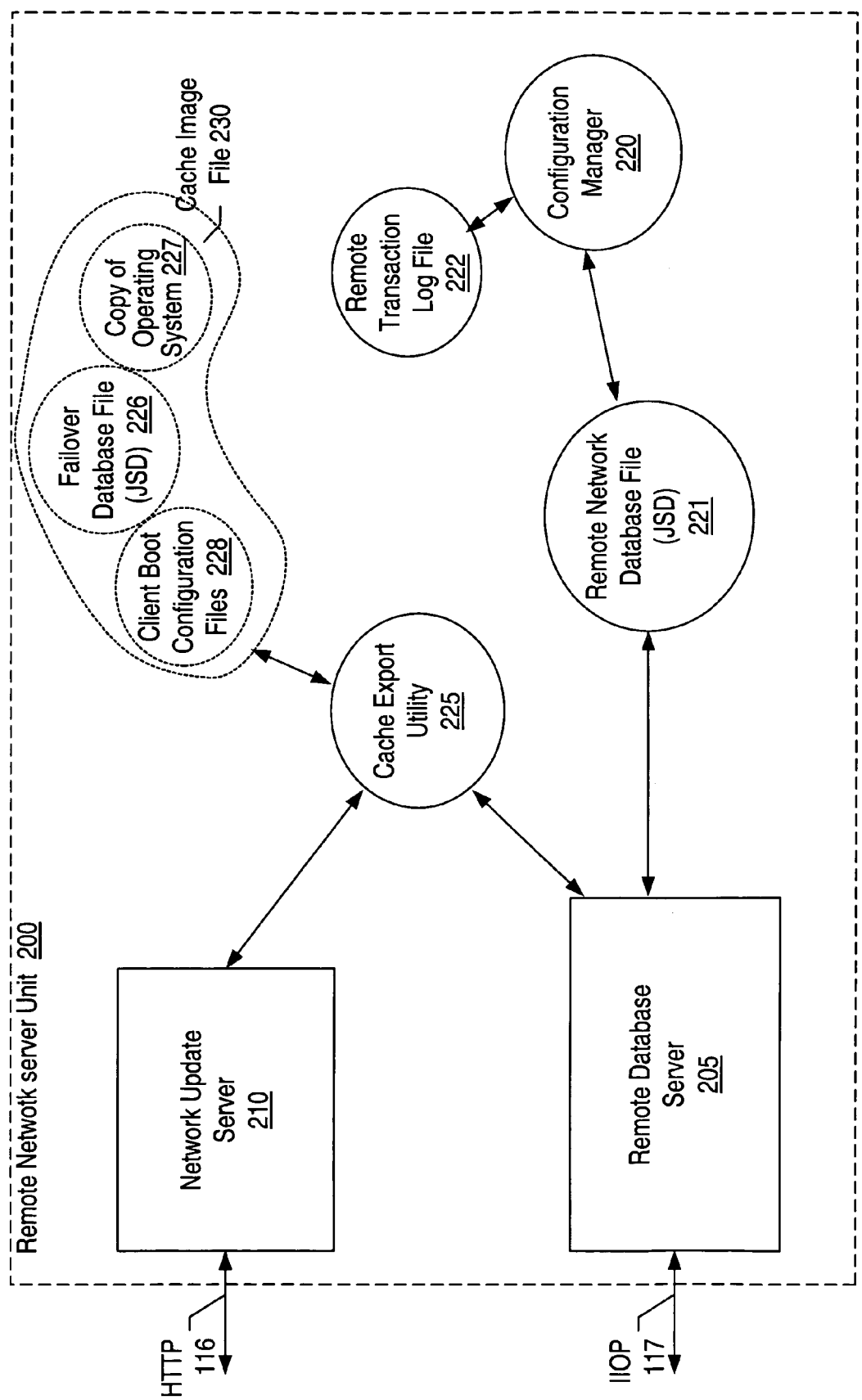
FIG. 2 is a block diagram of one embodiment of a remote network server unit.

Referring to FIG. 2, a block diagram of one embodiment of a remote network server unit is shown. Remote network server unit 200 includes a network update server 210 and a remote database server 205 embodied in software and stored on remote storage device(s) (not shown).

Network update server 210 communicates with client computer system 100 of FIG. 1 over connection 116 using an Hypertext Transfer Protocol (HTTP) for example. Remote database server 205 communicates with client computer system 100 of FIG. 1 over connection 117 using an Internet InterOrb Protocol (IIOP) for example. It is noted that both connection 116 and connection 117 may share the same physical connection to the network.

A network database file 221, which in one embodiment may be a Java™ System Database (JSD), is stored on remote network server unit 200. A JSD is an object-oriented configuration database. The JSD generally may allow an operating system, system services, applications, utilities, and other software components to store and retrieve configuration information concerning the software and hardware of a platform, typically a Java™-based platform such as a network computer. Configuration information may be arranged to describe, for example, the physical devices that are present in a machine associated with the JSD, the system software services that are installed, and specific user and group application profiles. The JSD may serve as a central repository to store, as well as access, substantially any information which is used for configuration purposes.

Accordingly, network database file 221 may contain information such as network configuration, client computer configuration and user profiles. Network database file 221 may be used by client computer system 100 of FIG. 1 for network environment configuration information as well as specific user profile configurations. User profiles may include information such as which application software a user typically uses and which fonts are supported.

Additionally, a cache export utility 225 and a configuration manager 220 are also stored on remote network server unit 200. Cache export utility 225 creates a cache manifest file which lists all the files necessary to create a cache image file 230 for each client computer system in the network. In one embodiment, the list of files in the cache manifest file may contain both the locations and the version numbers of the files. Cache export utility 225 may allow a system administrator to select the configuration of each client computer system by adding or deleting filenames from the list in the cache manifest file. Cache image file 230 contains all the files necessary for client computer system 100 of FIG. 1 to boot up and run while disconnected from remote network server unit 200 in a disconnected mode. In one embodiment, cache image file 230 may include boot parameter files (not shown), the operating system (e.g. JavaOS™) 227, client boot configuration files 228, portions of network database file 221, referred to as a failover database file 226 and application files (not shown). Cache image file 230 is maintained on remote network server unit 200. As will be described in greater detail below, cache image file 230 is also exported to client computer system 100 of FIG. 3 as a client cache image file 130. Configuration manager 220 manages client configurations and changes to network database file 221, which are kept in a remote transaction log file 222.

Remote database server 205 allows client computer system 100 of FIG. 1 to access network database file 221 stored in remote network server unit 200 of FIG. 2 while client computer system 100 of FIG. 1 is connected to remote network server unit 200 of FIG. 2.

Figure 3:
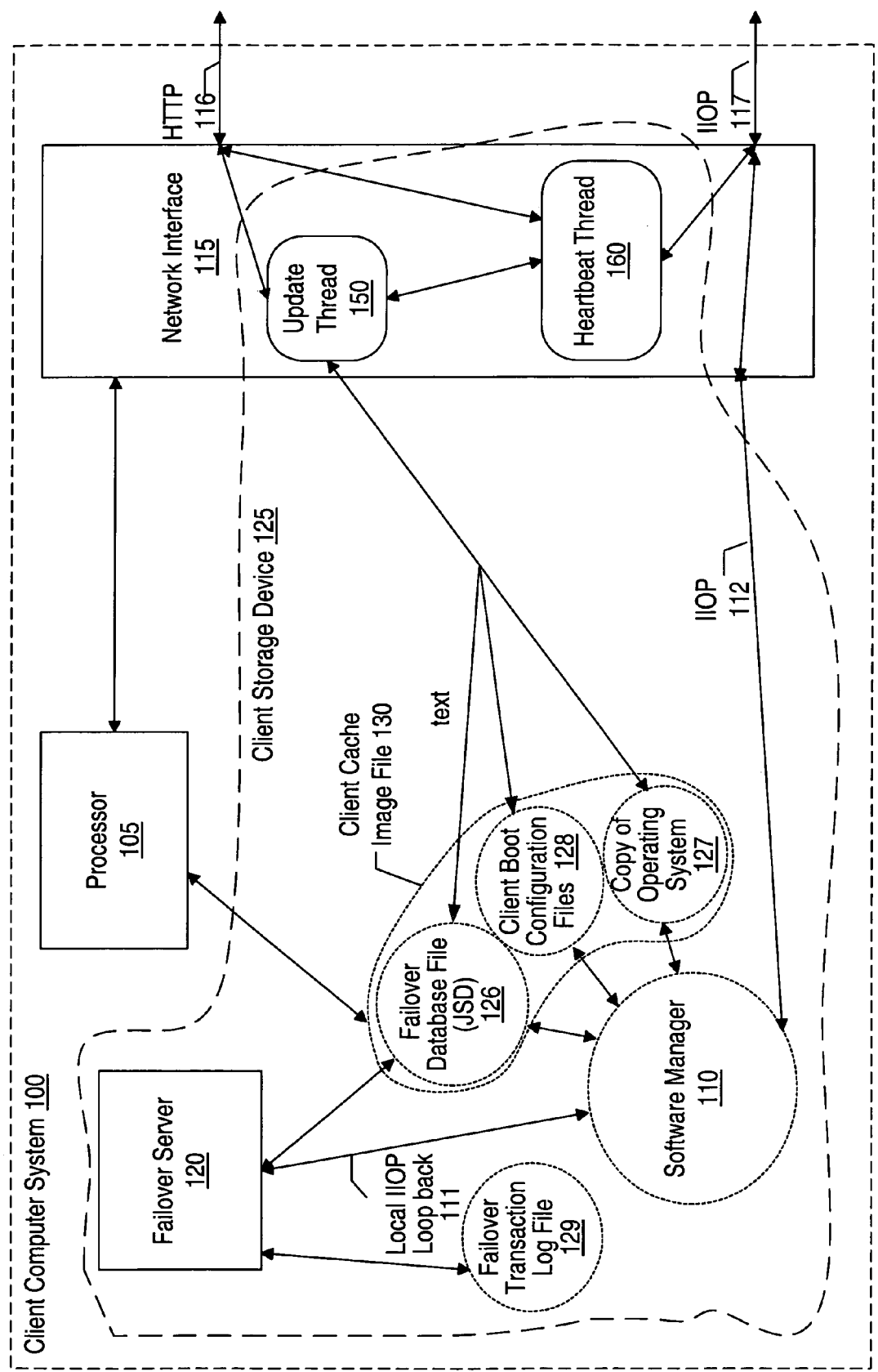
FIG. 3 is a block diagram of one embodiment of a client computer system.

Turning now to FIG. 3, a block diagram of one embodiment of a client computer system is shown. Client computer system 100 includes a processor 105 coupled to a client storage device 125. A failover server 120, embodied in software, is stored in client storage device 125. Processor 105 is also coupled to a network interface 115. It is noted that in one embodiment, client storage device 125 may be a hard disk drive. In other embodiments, client storage device 125 may be comprised of other types of storage devices such as, for example, a flash memory unit, a ram storage unit or an optical storage unit.

Network interface 115 provides communication links to remote network server unit 200 of FIG. 1 using a connection 116 (e.g. HTTP) and a connection 117 (e.g. IIOP). Processor 105 of FIG. 3 executes software embodied in a software manager 110 stored in client computer system 100. Software manager 110 is configured to select either IIOP connection 117 to remote database server 205 of FIG. 2 or a local IIOP loop back connection 111 to failover server 120 of FIG. 3. Software manager 110 uses a loop back function to connect to failover server 120 if IIOP connection 117 to remote database server 205 of FIG. 2 is unavailable. Functionally, the connection to failover server 120 looks identical to the connection to remote database server 205 of FIG. 2 to software manager 110 of FIG. 3.

As described above, network update server 210 of FIG. 2 exports cache image file 230 of FIG. 2 to client computer system 100 of FIG. 3, where it is shown as client cache image file 130 in FIG. 3. Software manager 110 uses failover server 120 to access failover local database file 126 referred to as a failover JSD, to configure a network environment and to run applications on client computer system 100 when remote database server 205 and therefore network database file 221 of FIG. 2 is not available.

When a connection to remote database server 205 of FIG. 2 is not available and client computer system 100 of FIG. 3 is running in a disconnected mode, any changes made to failover local database file 126 are kept in a failover transaction log file 129 stored on client storage device 125.

Additionally, in order to facilitate login authentication during disconnected mode a user may log in either in a bypass mode, where login authentication is bypassed and applications my be started, or in a database authentication mode. The database authentication mode uses an encrypted database password property. The login service is provided to allow an administrator to optionally enable user passwords when user profiles are set up. The login service may be used in lieu of, for example, a network information service (NIS) or native language support (NSL) authenticator. Alternatively, in other embodiments, the login service may be implemented to use the NIS or NSL login password and to cache that password in failover local database file 126.

Alternatively, if a connection to a remote database server is available and client computer system 100 is running in a connected mode, a heartbeat thread 160 may periodically monitor connection 117 and notify an update thread 150 if the connection is available and an update sequence is necessary. Update thread 150 may perform an update sequence by comparing the version numbers of files in client cache image file 130 of FIG. 3 with the version numbers of files in cache image file 230 of FIG. 2. As will be discussed in more detail below, update thread 150 of FIG. 3 may also notify network update server 210 of FIG. 2 if the version numbers are different and network update server 210 may update cache image file 230 and export the updated cache image file to client computer system 100 of FIG. 3.

Figure 4:
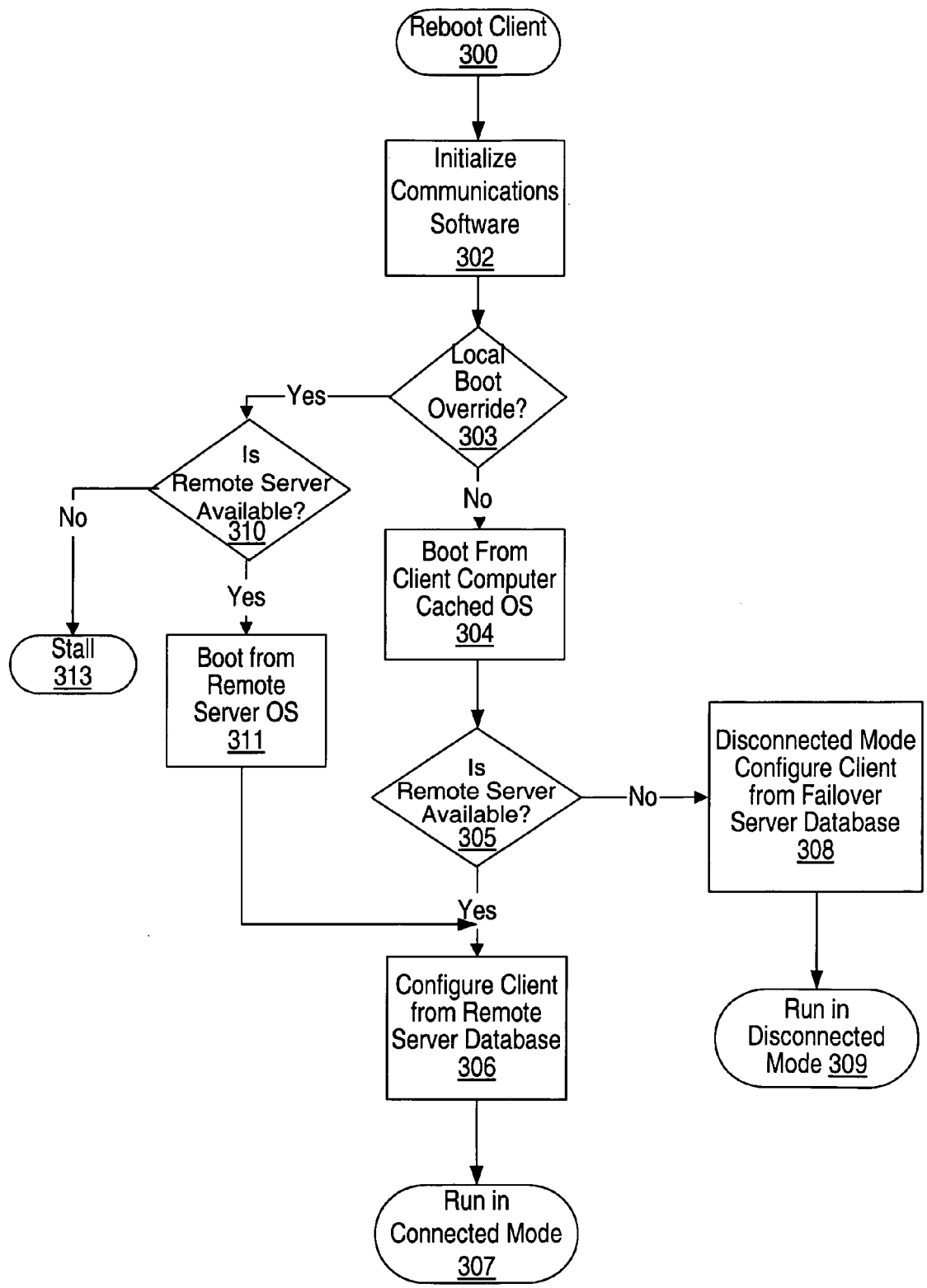
FIG. 4 is a flow diagram of the operation of one embodiment of the network computer system described in FIG. 2 and FIG. 3.

Referring now to FIG. 4, a flow diagram of the operation of one embodiment of the network computer system of FIG. 2 and FIG. 3 is illustrated. The flow diagram describes the operation for embodiments depicted in FIG. 2 and FIG. 3. The flow diagram begins in step 300 where client computer system 100 of FIG. 3 is rebooted. In FIG. 4, operation proceeds to step 302, where files, such as client boot configuration files 128 of FIG. 3, essential to the operation of network interface 115 of FIG. 3 are executed. Once the communications protocol is established, operation proceeds to step 303 of FIG. 4. In step 303, the boot process checks for an operator invoked key sequence indicating a local device boot override. If the boot override sequence has been initiated, operation proceeds to step 310 where heartbeat thread 160 of FIG. 3 checks for a connection to remote database server 205 of FIG. 2. If remote database server 205 is available, a new copy of the operating system is downloaded to client computer system 100 of FIG. 3 and client computer system 100 boots from the new copy of the operating system. This step provides a method of replacing a corrupted cache copy of the operating system. Once the operating system is loaded, operation proceeds to step 306 of FIG. 4 where software manager 110 of FIG. 3 will configure client computer system 100 using network database file 221 located on remote network server 200 of FIG. 2. Once client computer system 100 of FIG. 3 is configured for the current user, operation proceeds to step 307 of FIG. 4 where client computer system 100 of FIG. 3 runs in connected mode.

Returning back to step 310 of FIG. 4, if remote database server 205 is not available, then the operation proceeds to step 313 of FIG. 4. In step 313, the boot process stalls and an error message may be displayed indicating that the boot process has stalled and operator intervention is required.

Returning back to step 303 of FIG. 4, if the local device boot override sequence has not been initiated, operation proceeds to step 304, where client computer system 100 of FIG. 3 loads a local copy of the operating system 127 which is stored in client storage device 125 of FIG. 3. Once the operating system has loaded, operation proceeds to step 305 of FIG. 4, where heartbeat thread 160 of FIG. 3 checks for a connection to remote database server 205 of FIG. 2. If remote database server 205 is not available, the operation will proceed to step 308 of FIG. 4 where software manager 110 of FIG. 3 switches to failover server 120 and client computer system 100 will be configured from failover local database file 126. Once client computer system 100 is configured for the current user, operation proceeds to step 309 of FIG. 4 where client computer system 100 of FIG. 3 runs in a disconnected mode.

Referring back to step 305 of FIG. 4, if remote database server 205 of FIG. 2 is available, the operation will proceed to step 306 of FIG. 4, where software manager 110 of FIG. 3 configures client computer system 100 using remote network database file 221 located on remote storage device 215 of FIG. 2. Once client computer system 100 of FIG. 3 is configured for the current user, operation proceeds to step 307 of FIG. 4 where client computer system 100 of FIG. 3 runs in a connected mode.

Figure 5:
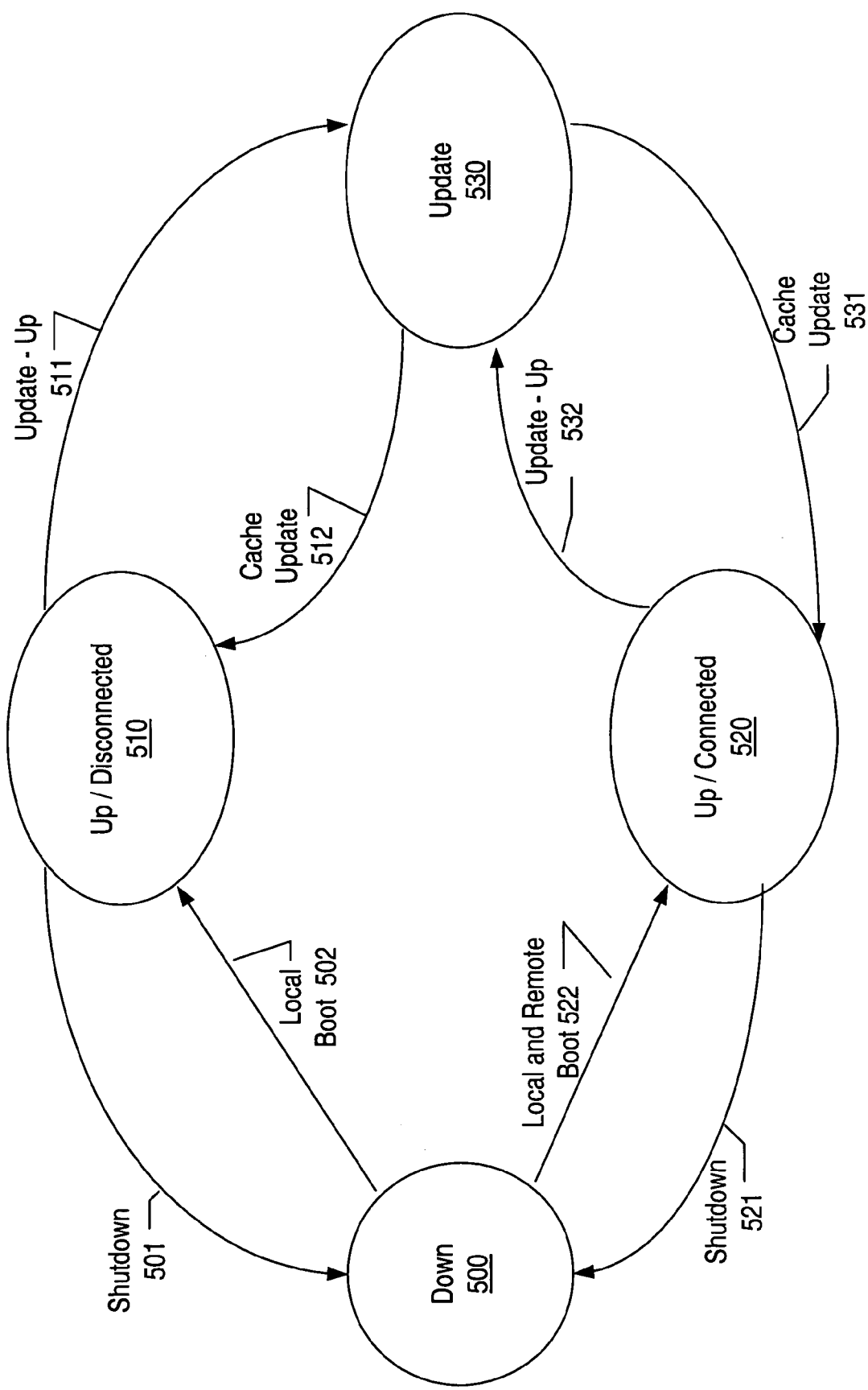
FIG. 5 is a state diagram of one embodiment of a client computer system.

Turning now to FIG. 5, a state machine of one embodiment of client computer system 100 of FIG. 3 is shown. The state machine describes the different states that client computer system 100 may be in or may enter and the transition events that may occur to cause a state change. The state machine begins in a down state 500. Down state 500 may be entered by any shutdown event, such as a power down. The state machine may transition from down state 500 to either up/disconnected state 510 or up/connected state 520.

From down state 500, the machine may transition to up/disconnected state 510 by a local boot 502 event. Local boot 502 event occurs when remote network server unit 200 of FIG. 2 is not available and client computer system 100 of FIG. 3 boots and configures from files stored locally. The state machine may transition back to down state 500 by a shutdown event 501.

From up disconnected state 510, the machine may transition to update state 530 by an update-up 511 event. Update-up 511 event occurs if heartbeat thread 160 of FIG. 3 detects a connection to network update server 210 of FIG. 2 and generates an update request to update thread 150 of FIG. 3. Update thread 150 may request a resynchronization of the cache on client computer system 100.

Once in update state 530, cache export utility 225 of FIG. 2 creates an updated cache image file. From update state 530, the machine may transition back to up/disconnected state 510 by a cache update 512 event. Cache update 512 event occurs when network update server 210 of FIG. 2 exports the updated cache image file to client computer system 100 of FIG. 3.

From down state 500, the machine may transition to up/connected state 520 by a local and remote boot 522 event. Local and remote boot 522 event occurs when remote network server unit 200 of FIG. 2 is available and client computer system 100 of FIG. 3 boots from files stored locally and configures from files stored on remote network server unit 200 of FIG. 2. The state machine may transition back to down state 500 by a shutdown event 521.

From up/connected state 520, the machine may transition to update state 530 by an update-up 532 event. Update-up 532 event occurs if heartbeat thread 160 of FIG. 3 detects a connection to network update server 210 of FIG. 2 and generates an update request to update thread 150 of FIG. 3. Update thread 150 may request a resynchronization of the cache on client computer system 100.

Once in update state 530, cache export utility 225 of FIG. 2 creates an updated cache image file. From update state 530, the machine may transition back to up/connected state 520 by a cache update 531 event. Cache update 531 event occurs when network update server 210 of FIG. 2 exports the updated cache image file to client computer system 100 of FIG. 3.

Figure 6A:
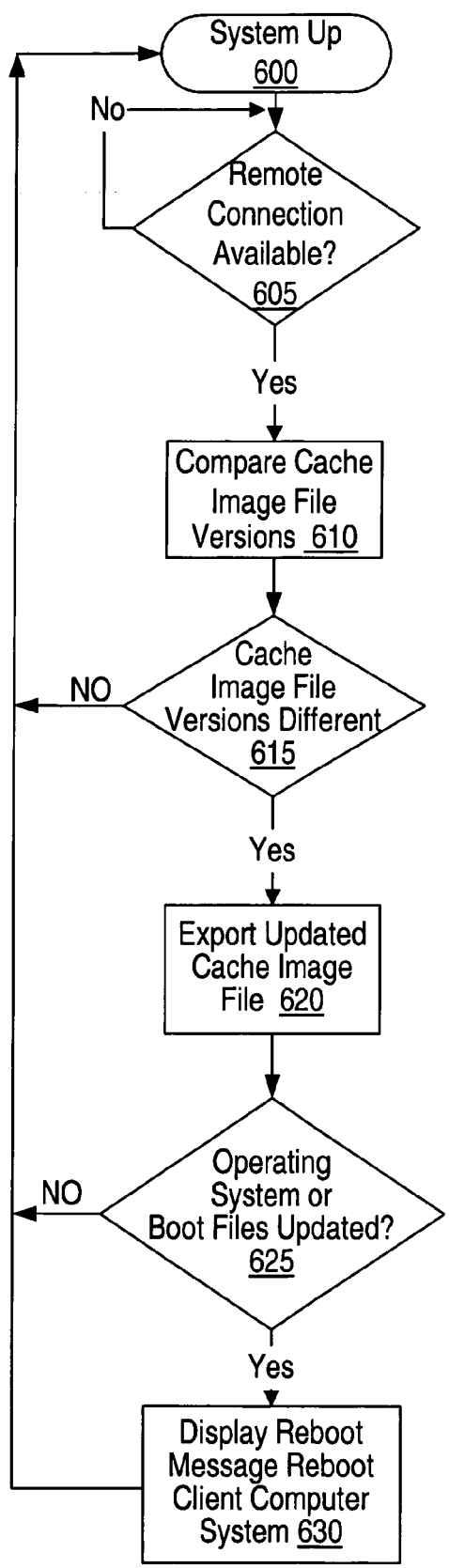
FIG. 6A is a flow diagram illustrating one embodiment of a cache update service.

Referring to FIG. 6A, a flow diagram illustrating one embodiment of a cache update service is shown. The flow diagram describes the cache update service in conjunction with FIG. 2 and FIG. 3. The flow diagram begins in step 300 where client computer system 100 of FIG. 3 is running in a connected or a disconnected mode. Operation proceeds to step 305 of FIG. 6A where heartbeat thread 160 of FIG. 3 continually monitors connection 116 to network update server 210 of FIG. 2 at intervals which may be determined by a software loop or a hardware function. If connection 116 is not available, heartbeat thread 160 continues to monitor connection 116 to network update server 210 of FIG. 2. If connection 116 is available, heartbeat thread 160 of FIG. 3 notifies update thread 150 to perform an update sequence. Operation proceeds to step 610 of FIG. 6A, where update thread 150 compares version numbers of files in cache image file 230 of FIG. 2 with version numbers of files located in client cache image file 130 of FIG. 3. Operation then proceeds to step 615 of FIG. 6A, where if the version numbers are not different, operation proceeds back to step 600. Going back to step 615, if the where if the version numbers are different, operation proceeds to step 620, where update thread 150 of FIG. 3 notifies network update server 210 of FIG. 2 to perform an upgrade. In step 620 of FIG. 6A, an upgrade may be performed by either a bulk update, which completely replaces entire cache image file 130 of FIG. 3 or by updating only those files which have been modified. Once the cache image file is regenerated, network update server 210 of FIG. 2 exports cache image file 230 of FIG. 2 to client computer system 100 of FIG. 3. Operation proceeds to step 625 of FIG. 6A. In step 625, if operating system files or early boot files were not modified, operation proceeds back to step 600 where client computer system 100 of FIG. 3 is up and running with an updated client cache image file. Referring back to step 625, if operating system files or early boot files were modified, operation proceeds to step 630 where client computer system 100 of FIG. 3 must be rebooted for the changes to take effect. In a preferred embodiment, network update server 210 of FIG. 2 will not automatically reboot client computer system 100 of FIG. 3. Instead, a notification panel will be displayed to inform a user that a reboot is necessary when any current tasks are completed. Client cache image file 130 updates should be performed in an atomic manner, whereby a copy of the current client cache image file 130 is made and a cache image rollback feature may be implemented. The rollback feature would allow the cache image to roll back to a previous version if the update fails or client computer system 100 of FIG. 3 fails to boot with the new cache image file.

If changes are made to failover local database file 126 of FIG. 3, in one embodiment, a different update sequence may be required for failover network database file updates since both failover local database file 126 of FIG. 3 and network database file 221 of FIG. 2 may have been modified. In this case, failover transaction log file 129 contains a record of the changes made to the failover local database file 126. Remote transaction log file 222 of FIG. 2 contains a record of all changes made to network database file 221.

Figure 6B:
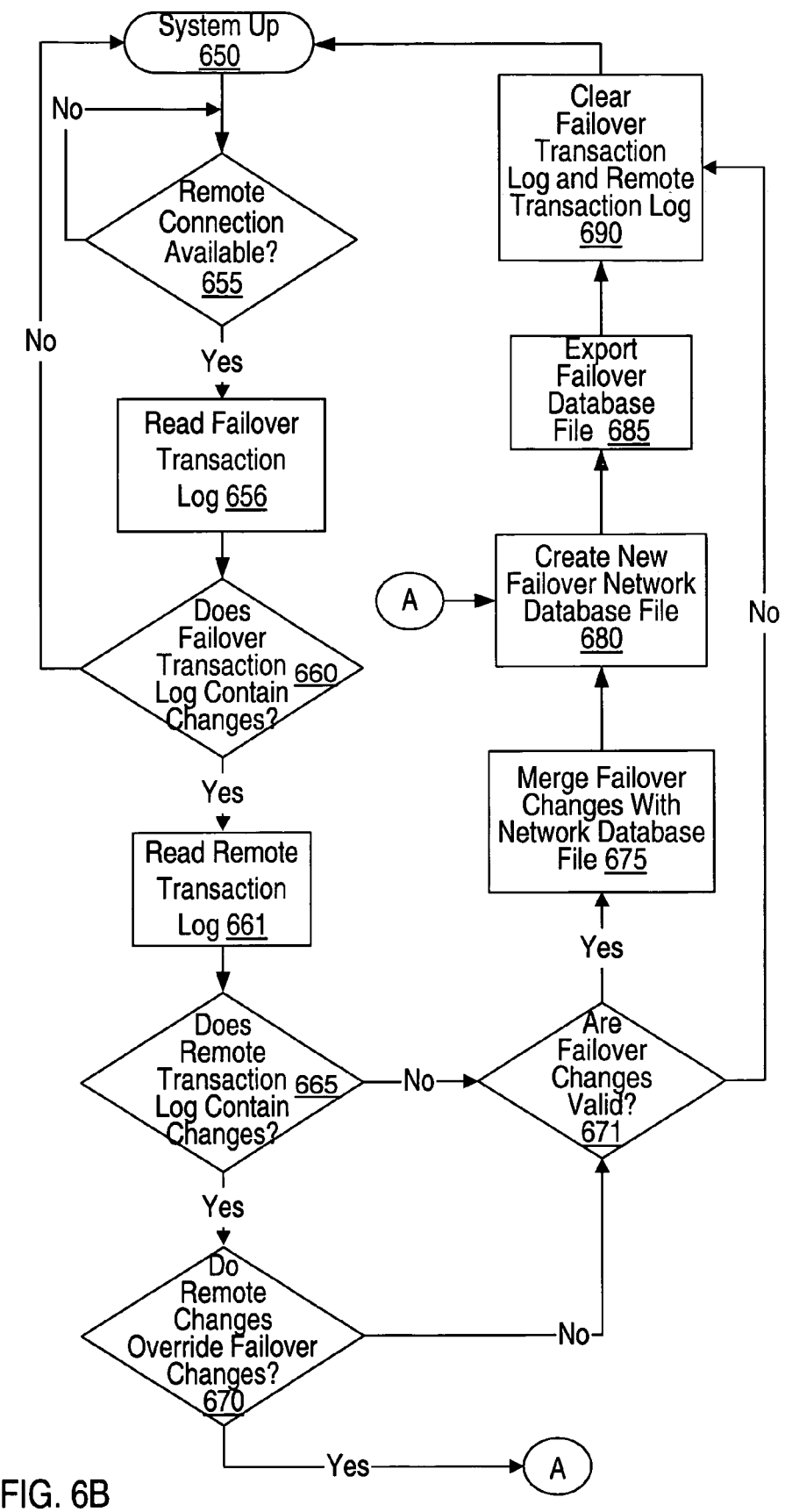
FIG. 6B is a flow diagram illustrating one embodiment of a cache update service.

Turn now to FIG. 6B, a flow diagram illustrating one embodiment of a cache update service is shown. Using FIG. 2 and FIG. 3, the flow diagram of FIG. 6B describes events which may occur in the event that changes are made to failover local database file 126 of FIG. 3. The flow diagram begins in step 650 where client computer system 100 of FIG. 3 is running in a connected or a disconnected mode. Operation proceeds to step 655 where heartbeat thread 160 of FIG. 3 continually monitors connection 116 to network update server 210 of FIG. 2 at intervals which may be determined by a software loop or a hardware function. If connection 116 is not available, heartbeat thread 160 of FIG. 3 continues to monitor connection 116 to network update server 210 of FIG. 2. Referring back to step 655 of FIG. 6B, if connection 116 is available, heartbeat thread 160 of FIG. 3 notifies update thread 150 to perform an update sequence. Operation now proceeds to step 656 of FIG. 6B where network update server 210 of FIG. 2 reads failover transaction log file 129 of FIG. 3. Operation proceeds to step 660 of FIG. 6B and if no changes were made to failover transaction log file 129 of FIG. 3, operation proceeds back to step 650 where client computer system 100 if FIG. 3 is up and running. Referring back to step 660 of FIG. 6B, if changes were made to failover transaction log file 129 of FIG. 3, operation proceeds to step 661 of FIG. 6B where network update server 210 of FIG. 2 reads remote transaction log file 222 of FIG. 2. Operation proceeds to step 665 of FIG. 6B and if changes were recorded to remote transaction log file 222 of FIG. 2 then operation proceeds to step 670 of FIG. 6B. In step 670, network update server 210 of FIG. 2 decides whether the changes made to the network database file 221 override the changes made to failover local database file 126 of FIG. 3. If the changes made to the network database file 221 of FIG. 2 do override the changes made to failover local database file 126 of FIG. 3, then operation proceeds to step 680 of FIG. 6B where a new failover database file 226 of FIG. 2 is created by cache export utility 225. Operation then proceeds to step 685 of FIG. 6B where cache export utility 225 of FIG. 2 sends failover database file 226 to client computer system 100 of FIG. 3. Operation then proceeds to step 690 where the failover transaction log of FIG. 3 and the remote transaction log of FIG. 2 are cleared. Operation then proceeds back to step 650 of FIG. 6B where client computer system 100 if FIG. 3 is up and running.

Referring back to step 670 of FIG. 6B, if the changes made to the network database file 221 of FIG. 2 do not override the changes made to failover local database file 126 of FIG. 3, then operation proceeds to step 671 of FIG. 6B where the changes made to failover local database file 126 of FIG. 3 are checked for validity. If the changes are determined to be valid, operation proceeds to step 675 of FIG. 6B where the changes made to failover local database file 126 of FIG. 3 are merged with network database file 221 of FIG. 2. Operation then proceeds to step 680 as described above.

Referring back to step 671 of FIG. 6B, if the changes are determined not to be valid, operation proceeds to step 690 of FIG. 6B where the failover transaction log of FIG. 3 and the remote transaction log of FIG. 2 are cleared as described above. An example of an invalid change might be a user trying to change a permission parameter for which the user is not authorized whereby the change would be deemed invalid.

Referring back now to step 665 of FIG. 6B. If no changes were recorded in remote transaction log file 222 of FIG. 2 then operation proceeds to step 671 of FIG. 6B as described above.

Network update server 210 decides whether to accept all changes made to failover local database file 126 of FIG. 3 and the changes that are accepted are merged into network database file 221 of FIG. 2. A new merged failover database file 226 is generated by cache export utility 225 and then pushed back to client computer system 100 of FIG. 3 and failover transaction log file 129 and remote transaction log file 222 of FIG. 2 are cleared.

Numerous variations and modifications will become apparent to those skilled in the art once the above disclosure is fully appreciated. It is intended that the following claims be interpreted to embrace all such variations and modifications.

What is claimed is:

1. A client computer system, comprising:
   a client storage device;
   a processor coupled to said client storage device, wherein said processor is configured to execute software instructions stored in said client storage device;
   a network interface configured for connecting said computer system to a remote network server unit, wherein said remote network server unit is configured to provide a file for initializing and configuring a network environment on said client computer system when said client computer system boots up;
   a fail-over server implemented on said client computer system, wherein said fail-over server is configured to provide for configuring said network environment on said client computer system when said client computer system boots up if said remote network server unit is not available; and
   a software manager stored in said client storage device, wherein said software manager is configured to establish a connection to said remote network server unit if said remote network server unit is available to configure said network environment on said client computer system upon boot up or to establish a connection to said fail-over server if said remote network server unit is not available and to configure said network environment upon boot up to appear to a user as though said client computer system is connected to said remote network server unit when said client computer system is connected to said fail-over server, wherein the connection to said failover server functions like the connection to said remote network server unit for configuring the client computer system upon boot up.

2. The client computer system as recited in claim 1, wherein said file is a client cache image file comprising:
   a copy of an operating system;
   a copy of client boot configuration files; and
   a copy of a network database file for configuring said network environment for said client computer system if said remote network server unit is not available.

3. The client computer system as recited in claim 2, wherein said client cache image file further comprises a copy of application software specified in said copy of a network database file.

4. The client computer system as recited in claim 3, wherein said client computer system is further configured to operate from said copy of an operating system, which is stored on said client storage device.

5. The client computer system as recited in claim 2, wherein said client computer system includes an update thread, wherein said update thread is configured to perform an update sequence when connected to said remote network server unit, which includes a network update server and a remote database server, said update sequence comprising:
   comparing a first group of version numbers associated with files within said client cache image file located on said client computer system with a second group of version numbers associated with files within a second client cache image file located on said remote network server unit;
   notifying said network update server when said first group of version numbers and said second group of version numbers are not the same; and
   if said first and said second groups of version numbers are not the same, receiving an updated client cache image file from said network update server.

6. The client computer system as recited in claim 5, wherein said failover server is further configured to record changes to said copy of a network database file stored on said client storage device in a transaction log file.

7. The client computer system as recited in claim 6, wherein said update sequence further comprises:
   said network update server reading said transaction log file and determining if changes have been made to said copy of a network database file;
   if changes have been made to said copy of a network database file, said network update server determining if said changes are valid;
   if said changes are valid, said network update server merging said changes into a network database file located on said remote network server unit;
   said network update server creating an updated copy of a network database file and sending said updated copy of a network database file to said client computer system;
   said software manager clearing said transaction log file.

8. The client computer system as recited in claim 7 further comprising a heartbeat thread, which monitors a connection to said remote network server unit, wherein said heartbeat thread is configured to notify said update thread when said connection is available and said update sequence is necessary.

9. A network computer system, comprising:
   a remote network server unit configured to maintain a file on a remote storage device and to provide said file for initializing and configuring a network environment on a client computer system when said client computer system boot up;
   said client computer system coupled to said remote network server unit including:
      a client storage device;
      a processor coupled to said client storage device, wherein said processor is configured to execute software instructions stored in said client storage device;
      a network interface configured for connecting said computer system to a remote network server unit;
      a fail-over server implemented on said client computer system, wherein said failover server is configured to provide for configuring said network environment on said client computer system when said client computer system boots up if said remote network server unit is not available; and
      a software manager stored in said client storage device, wherein said software manager is configured to establish a connection to said remote network server unit if said remote network server unit is available to configure said network environment on said client computer system upon boot up or to establish a connection to said fail-over server if said remote network server unit is not available and to configure said network environment upon boot up to appear to a user as though said client computer system is connected to said remote network server unit when said client computer system is connected to said fail-over server, wherein the connection to said failover server functions like the connection to said remote network server unit for configuring the client computer system upon boot up.

10. The network computer system as recited in claim 9, wherein said client computer system is further configured to receive said file from said remote network server unit, wherein said file is a client cache image file comprising:
  a copy of an operating system;
  a copy of client boot configuration files; and
  a copy of a network database file for configuring said network environment for said client computer system if said remote network server unit is not available.

11. The network computer system as recited in claim 10, wherein said client cache image file further comprises a copy of application software specified in said copy of a network database file.

12. The network computer system as recited in claim 10, wherein said client computer system is further configured to operate from said copy of an operating system, which is stored on said client storage device.

13. The network computer system as recited in claim 10, wherein said client computer system includes an update thread, wherein said update thread is configured to perform an update sequence when connected to said remote network server unit, which includes a network update server and a remote database server, said update sequence comprising:
  comparing a first group of version numbers associated with files within said client cache image file located on said client computer system with a second group of version numbers associated with files within a second client cache image file located on said remote network server unit;
  notifying said network update server when said first group of version numbers and said second group of version numbers are not the same; and
  if said first and said second groups of version numbers are not the same, receiving an updated client cache image file from said network update server.

14. The network computer system as recited in claim 13, wherein said network update server is configured to update said client cache image file stored on said client storage device with a cache image file stored on said remote network server unit in response to receiving a notification from said update thread.

15. The network computer system as recited in claim 14, wherein said network update server is further configured to update said network database file by:
  reading said transaction log file and determining if changes have been made to said copy of a network database file;
  if changes have been made to said copy of a network database file then determining if said changes are valid;
  if said changes are valid, merging said changes into a network database file located on said remote network server unit;
  creating an updated copy of a network database file and sending said updated copy of a network database file to said client computer system;
  notifying said software manager to clear said transaction log file.

16. The network computer system as recited in claim 15, wherein said client computer system further comprises a heartbeat thread monitoring a connection to said remote network server unit, and said heartbeat thread notifying said update thread when said connection is available and said update sequence is necessary.

17. The network computer system as recited in claim 10, wherein said failover server is further configured to record changes to said copy of a network database file stored on said client storage device in a transaction log file.

18. A method for operating a network computer system including a remote network server unit and a client computer system, said method comprising:
  during boot up of said client computer system, determining whether said remote network server unit is connected to said client computer system;
  if said remote network server unit is hot connected to said client computer system, then said client computer system establishing a connection to a fail-over server implemented on said client computer system and using a file stored on a client storage device to initialize and to configure a network environment during boot up for said client computer system;
  if said remote network server unit is connected to said client computer system, then using a copy of an operating system from said file stored on said client storage device to initialize said client computer system and using a network database file located on said remote network server unit to configure said network environment during boot up for said client computer system;
  wherein the connection to the failover server functions like a connection to the remote network server for configuring the client computer system during boot up.

19. The method as recited in claim 18 further comprising, in response to a forced remote reboot command, said client computer system receiving an operating system from said remote network server unit to initialize said client computer system and using said network database file located on said remote network server unit to configure said network environment for said client computer system if said remote network server unit is connected to said client computer system.

20. The method as recited in claim 18 further comprising said client computer system receiving said file from said remote network server unit, wherein said file is a client cache image file comprising:
  said copy of an operating system;
  a copy of client boot configuration files; and
  a copy of a network database file for configuring said network environment for said client computer system if said remote network server unit is not available.

21. The method as recited in claim 20, wherein said client cache image file further comprises a copy of application software specified in said copy of a network database file.

22. The method as recited in claim 21 method further comprising an update thread performing an update sequence when connected to said remote network server unit, which includes a network update server and a remote database server, said update sequence comprising:
  comparing a first group of version numbers associated with files within said client cache image file located on said client computer system with a second group of version numbers associated with files within a second client cache image file located on said remote network server unit;
  notifying said network update server when said first group of version numbers and said second group of version numbers are not the same; and
  if said first and said second groups of version numbers are not the same, receiving an updated client cache image file from said network update server.

23. The method as recited in claim 22 further comprising said network update server updating said client cache image file stored on said client storage device with a cache image file stored on said remote network server unit in response to receiving a notification from said update thread.

24. The method as recited in claim 23, wherein said network update server is further configured to update said network database file by:
- reading said transaction log file and determining if changes have been made to said copy of a network database file;
- if changes have been made to said copy of a network database file then determining if said changes are valid;
- if said changes are valid then merging said changes into a network database file;
- creating an updated copy of a network database file and sending said updated copy of a network database file to said client computer system;
- notifying said software manager to clear said transaction log file.

25. The method as recited in claim 24 further comprising a heartbeat thread executing in said client computer system, monitoring a connection to said remote network server unit, and said heartbeat thread notifying said update thread when said connection is available and said update sequence is necessary.

26. The method as recited in claim 20 further comprising said failover server recording changes to said copy of a network database file stored on said client storage device in a transaction log file.

\* \* \* \* \*